US008024611B1

(12) United States Patent
Meek et al.

(10) Patent No.: US 8,024,611 B1
(45) Date of Patent: Sep. 20, 2011

(54) AUTOMATED LEARNING OF FAILURE RECOVERY POLICIES

(75) Inventors: Christopher A. Meek, Kirkland, WA (US); Guy Shani, Kibbutz Beit Kama (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/713,195

(22) Filed: Feb. 26, 2010

(51) Int. Cl.
G06F 11/00 (2006.01)
(52) U.S. Cl. .................................. 714/26; 714/2; 706/45
(58) Field of Classification Search ................. 714/2, 26, 714/33, 48
See application file for complete search history.

(56) References Cited

U.S. PATENT DOCUMENTS

| | | | | |
|---|---|---|---|---|
| 5,465,321 | A * | 11/1995 | Smyth .............................. | 706/20 |
| 6,009,246 | A * | 12/1999 | Chandra et al. .................. | 714/26 |
| 6,076,083 | A * | 6/2000 | Baker ............................. | 706/52 |
| 6,226,627 | B1 | 5/2001 | Polak | |
| 6,535,865 | B1 * | 3/2003 | Skaaning et al. ............... | 706/52 |
| 7,451,340 | B2 * | 11/2008 | Doshi et al. ................... | 714/47.2 |
| 7,536,595 | B1 | 5/2009 | Hiltunen et al. | |
| 7,539,748 | B2 * | 5/2009 | Williams ....................... | 709/224 |
| 2002/0019870 | A1 * | 2/2002 | Chirashnya et al. .......... | 709/224 |
| 2003/0093514 | A1 * | 5/2003 | Valdes et al. .................. | 709/224 |
| 2005/0028033 | A1 * | 2/2005 | Kipersztok et al. ............. | 714/27 |
| 2005/0160324 | A1 * | 7/2005 | Przytula et al. ................. | 714/43 |
| 2005/0240796 | A1 * | 10/2005 | Dziong et al. .................... | 714/2 |
| 2007/0288795 | A1 * | 12/2007 | Leung et al. .................... | 714/26 |
| 2008/0010483 | A1 * | 1/2008 | Kuroishi et al. .................. | 714/2 |
| 2008/0059839 | A1 * | 3/2008 | Hamilton et al. ............... | 714/26 |
| 2008/0300879 | A1 * | 12/2008 | Bouchard et al. ............. | 704/256 |

OTHER PUBLICATIONS

Bohus, et al. , "Towards Automatic Learning of Non-understanding Recovery Policies", Retrieved at <<http://www-2.cs.cmu.edu/~dbohus/docs/nonu_policies.pdf>>, 2005, pp. 12.
Joshi, et al. , "Automatic Recovery Using Bounded Partially Observable Markov Decision Processes", Retrieved at <<http://perform.csl.illinois.edu/Papers/USAN_papers/05JOS02.pdf>>, Jun. 25-28, 2006, pp. 10.
He, et al. , "Using Reinforcement Learning for Proactive Network Fault Management", Retrieved at <<http://www.ee.umd.edu/~shayman/papers.d/icct_2000.ps>>, Aug. 21-25, 2000, pp. 1-7.
Williams, Jason D. , "A Probabilistic Model of Human/Computer Dialogue with Application to a Partially Observable Markov Decision Process", Retrieved at <<http://mi.eng.cam.ac.uk/~jdw30/willams2003PhDFirstYearReport.pdf>>, Aug. 29, 2003, pp. 52.
Bohus, Dan, "Error Awareness and Recovery in Task-Oriented Spoken Dialogue Systems", Retrieved at <<http://research.microsoft.com/en-us/um/people/dbohus/docs/proposal.pdf>>, 2004, pp. 49.
Williams, et al. , "Partially Observable Markov Decision Processes with Continuous Observations for Dialogue Management", Retrieved at <<http://svr-ftp.eng.cam.ac.uk/~sjy/papers/wipy05c.pdf>>, 2005, pp. 10.

(Continued)

*Primary Examiner* — Robert Beausoliel, Jr.
*Assistant Examiner* — Elmira Mehrmanesh (57) ABSTRACT

Described is automated learning of failure recovery policies based upon existing information regarding previous policies and actions. A learning mechanism automatically constructs a new policy for controlling a recovery process, based upon collected observable interactions of an existing policy with the process. In one aspect, the learning mechanism builds a partially observable Markov decision process (POMDP) model, and computes the new policy base upon the learned model. The new policy may perform automatic fault recovery, e.g., on a machine in a datacenter corresponding to the controlled process.

18 Claims, 3 Drawing Sheets

OTHER PUBLICATIONS

Bohus, et al., "Error Handling in the RavenClaw Dialog Management Framework", Retrieved at <<http://acl.ldc.upenn.edu/H/H05/H05-1029.pdf>>, Proceedings of Human Language Technology Conference and Conference on Empirical Methods in Natural Language Processing, Vancouver, Oct. 2005, pp. 225-232.

Littman, M. et al.; "An instance-based state representation for network repair"; Proceedings of the Nineteenth National Conference on Artificial Intelligence (AAAI); 2004; pp. 287-292.

Smallwood, R.D. et al.; "The optimal control of partially observable markov decision processes over a finite horizon"; Operations Research, Sep.-Oct. 1973; vol. 21, No. 5; pp. 1071-1088.

Baum, L. et al.; "A maximization technique occurring in the statistical analysis of probabilistic functions of markov chains"; The Annals of Mathematical Statistics; 1970; vol. 41, No. 1; pp. 164-171.

Pineau, J., et al.; "Point-based value iteration: An anytime algorithm for POMDPs"; International Joint Conference on Artificial Intelligence (IJCAI); Aug. 2003; pp. 1025-1032.

Spaan, M. et al.; "Perseus: Randomized point-based value iteration for POMDPs"; Journal of Artificial Intelligence Research; Aug. 2005; No. 24; pp. 195-220.

Hansen, E.; "Indefinite-Horizon POMDPs with Action-Based Termination"; Proceedings of the $22^{nd}$ National Conference on Artificial Intelligence; Jul. 2007; Vancouver, Canada; pp. 1237-1242.

* cited by examiner

AUTOMATED LEARNING OF FAILURE RECOVERY POLICIES

BACKGROUND

Recovery from computer failures due to software or hardware problems is a significant part of managing large data centers. Sometimes the failures may be automatically fixed through actions such as rebooting or re-imaging of the computer.

In large environments, it is prohibitively expensive to have a technician decide on a repair action for each observed problem. As a result, the data centers often employ recovery systems that use some automatic repair policy or controller to choose appropriate repair actions. Typically the repair policy/controller are manually defined and created by a human expert. More particularly, the expert creates policies that map the state of the system to recovery actions by specifying a set of rules or conditions under which an action is to be taken.

However, such policies/controllers are almost never optimal, in that even though they often fix an error, the error may actually be fixed in a faster (and thus correspondingly less expensive) way. As such, these policies may result in longer failure periods (system downtime) than needed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a learning mechanism automatically constructs a new policy that automatically controls a process based upon collected observable interactions of an existing policy with the process. In one aspect, the learning mechanism builds a model of the process, including effects of possible actions, and computes the new policy base upon the learned model. The new policy may perform automatic fault recovery, e.g., on a machine in a datacenter corresponding to the controlled process.

In one implementation, the model comprises a partially observable Markov decision process (POMDP). An expectation maximization algorithm (e.g., an adapted Baum-Welch algorithm) learns the POMDP model. The policy is then computed using a point-based value iteration algorithm, such as executed by a cost-based indefinite-horizon formalization.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a learning mechanism that uses the logged experience of an existing, imperfect recovery policy (used interchangeably with "controller" herein) for automatically learning a new, improved policy. To this end, the technology uses previous state sequences of interactions between the existing recovery policy, containing the observations (e.g., error messages) that the existing policy obtained, and the actions that the existing recovery policy executed. In one implementation, from these sequences a hidden state model is learned, which provides the new, improved policy for failure recovery. For example, the model may comprise a partially observable Markov decision process (POMDP) for generating recovery policies that automatically improves existing recovery policies.

It should be understood that any of the examples herein are non-limiting. Indeed, while data center failure recovery is exemplified herein, many other real world applications, such as assembly lines, medical diagnosis systems, and failure detection and recovery systems, are also controlled by handmade controllers, and thus may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and automated recovery in general.

Figure 1:
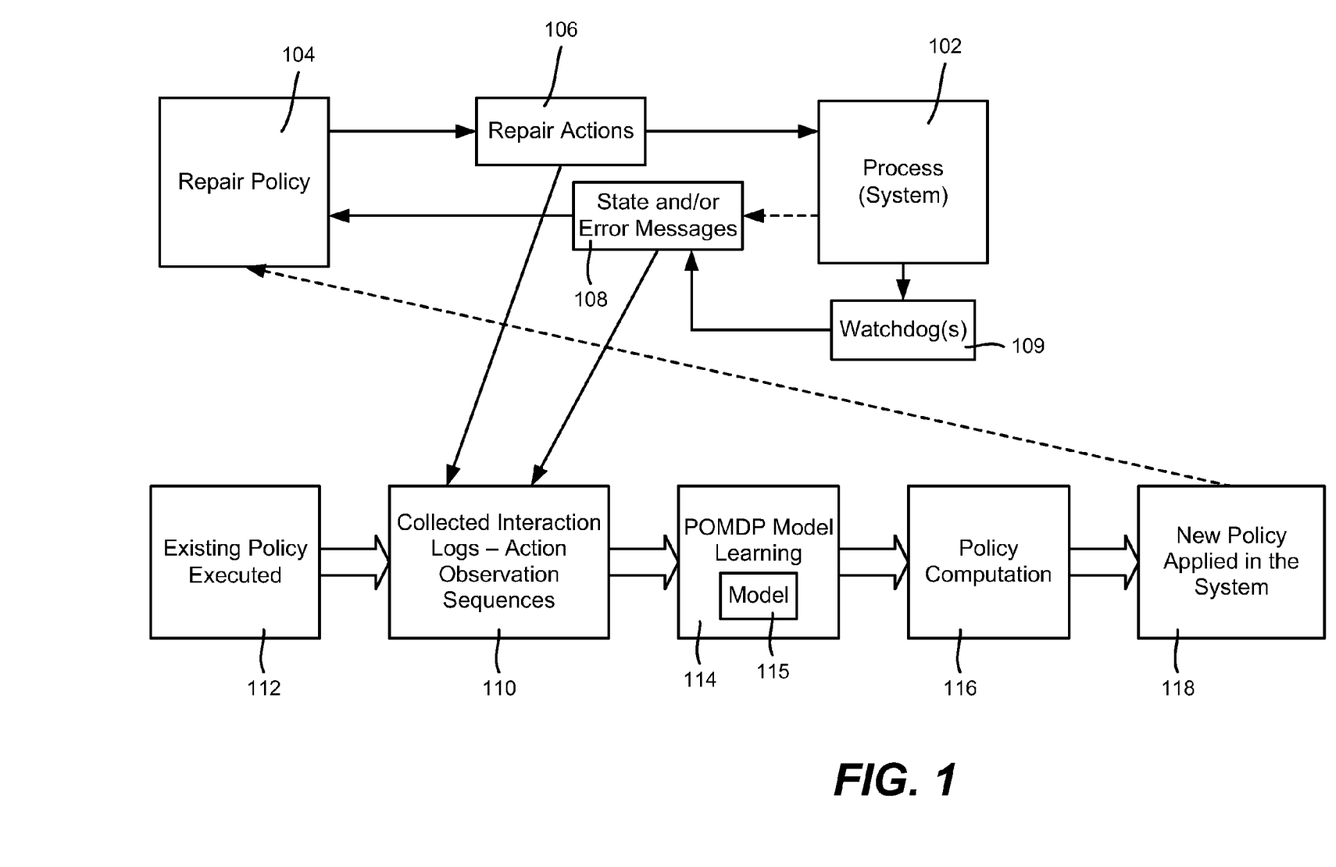
FIG. 1 is a block diagram representing example components/and environment for automated learning of failure recovery policies, and their application.

FIG. 1 shows a general example in which a process 102 (which can also be considered a system) is controlled by a repair policy 104. The illustrated process 102 is representative of any of a plurality of such processes/systems, such as in a large datacenter in which there is often a domain on the order of hundreds or thousands of such machines. Note that in many such domains, such machines are identical and independent, e.g., computers in service farms such as answering independent queries to a search engine may share the same configuration and execute independent programs. It is therefore unlikely, if not impossible, for errors to propagate from one machine to another.

As is known, these systems/processes may be automatically controlled by policies, in which a controlled system/process may be influenced by external actions. FIG. 1 shows the repair policy 104 deciding which repair actions 106 are to be taken to attempt to guide the process 102 towards a desired outcome.

Typically, the repair policy 104 (running on a computer system or the like) receives some observations about the state 108 of the process 102, such as from one or more watchdogs 109, comprising one or more other computers that probe the system 102, (or possibly from the process 102 itself). Given these observations, the repair policy 104 decides on what it determines is the most appropriate action. In other words, the policy 104 maps observations or states of the process 102 into appropriate actions. The observable interactions of the policy can be described as a sequence of observations and actions.

Note that the state 108 may include error messages that are received before, during or after a repair action is attempted, e.g., the repair policy may attempt a repair action based on one error message, and that repair action may result in another error message being generated, such as if the system soon fails again. More particularly, the repair policy 104 typically receives failure messages 108 about the process 102 via the one or more watchdog 109. Messages from watchdogs are often aggregated into a small set of notifications, such as "Software Error" or "Hardware Error."

As described herein, a model of the environment may be created and used to create a revised policy that is approximately optimal given the model. In one implementation, a POMDP is used by the learning mechanism for modeling such a process. A POMDP captures the (hidden) states of the process, the stochastic transitions between states given actions, the utilities of states and the cost of actions, and the probabilities of observations given states and actions. POMDPs are further described by Michael L. Littman and Nishkam Ravi in "An instance-based state representation for network repair," in Proceedings of the Nineteenth National Conference on Artificial Intelligence (AAAI, pages 287-292, (2004) and R. D. Smallwood and E. J. Sondik, in "The optimal control of partially observable markov decision processes over a finite horizon," Operations Research, 21:1071-1098, 1973.

However, specifying the parameters of such a model in a way that provides good results is often no easier than specifying a policy directly. Thus, the technology described herein is generally directed towards automatically learning such models. The learning process is based in part on evaluating parameters, such as the probability that a failure will be fixed given an action.

To this end, as represented in FIG. 1, logs 110 of the recovery interactions (collected in a known manner) for an existing imperfect policy 112 are used in POMDP model learning (by a suitable algorithm) 114. These logs 110 contain sequences of action observations that the policy 14 received as input, typically error messages 108 from the process 102 or information about the outcome of a repair action 106. These logs 110 may be used to process the input messages as noisy observations over the true failures of the system in order to learn the model parameters using standard Hidden Markov Model (HMM) learning techniques, such as expectation maximization (EM). One example of EM is the forward-backward (Baum-Welch) algorithm, described by Leonard E. Baum, Ted Petrie, George Soules, and Norman Weiss in "A maximization technique occurring in the statistical analysis of probabilistic functions of markov chains," The Annals of Mathematical Statistics, 41(1):164-171, 1970).

Given the learned POMDP model 115/parameters, an (approximately) optimal policy 118 for the learned model 115 may be computed, as represented in FIG. 1 via block 116. More particularly, with the learned POMDP model parameters, a policy 118 that optimizes repair costs may be computed, and then applied to the system as needed thereafter.

In one implementation, an approximate policy 118 may be rapidly computed via a point-based value iteration algorithm, (such as described by Joelle Pineau, Geoffrey Gordon, and Sebastian Thrun, in "Point-based value iteration: An anytime algorithm for pomdps"; In International Joint Conference on Artificial Intelligence (IJCAI), pages 1025-1032, August 2003). As this policy 118 is learned from the interactions logged from the existing policy 112, it is not guaranteed to be optimal for that system, yet it typically improves upon the previous policy. The improvement may be verified before the new policy 118 is implemented, as described below.

Turning to additional details, repair actions may succeed or fail stochastically, and often provide an escalating behavior. Actions may be labeled using increasing levels, where problems fixed by an action at level i, are also fixed by any action of level j>i. Probabilistically, this means that if j>i then pr(healthy|$a_j$,e)>pr(healthy|$a_i$,e) for any error a Action costs are also typically escalating, where lower level actions that fix minor problems are relatively cheap, while higher level actions are more expensive. In many real world systems this escalation can be considered roughly exponential. For example, restarting a service takes five seconds, rebooting a machine takes approximately ten minutes, while re-imaging the machine takes about two hours.

Another stochastic feature is inexact failure detection. A watchdog may report an error for a machine that is fully operational, or report a "healthy" status for a machine that experiences a failure.

In view of the escalating nature of actions and costs, one choice for a policy is an escalation policy. Such policies choose a starting entry level based on the first observation, and execute an action at that level. In many cases, due to the non-deterministic success of repair actions, each action is tried several times. After the controller decides that the action at the current level cannot fix the problem, the controller escalates to the next (more costly) action level, and so on.

Figure 2:
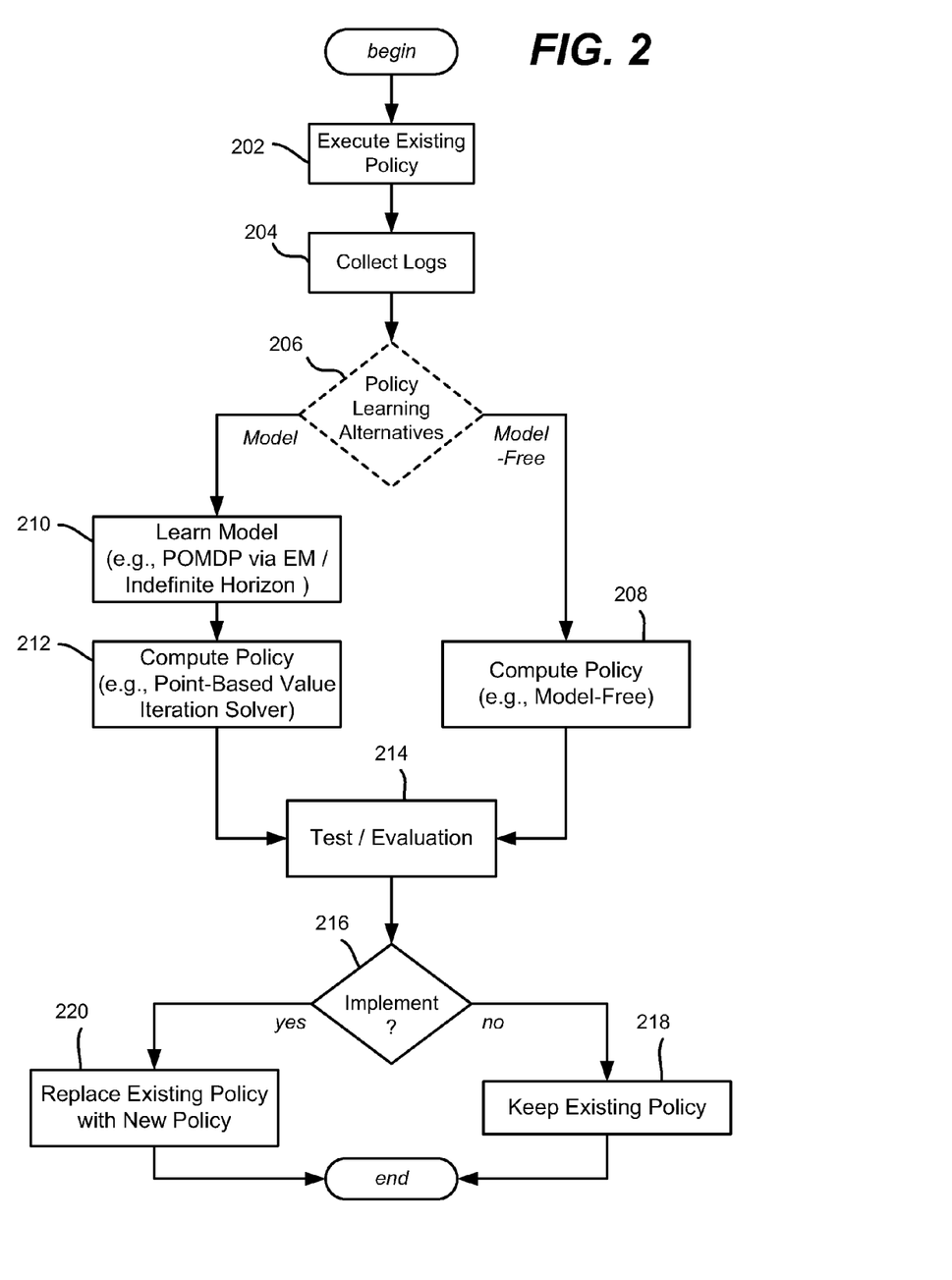
FIG. 2 is a flow diagram representing example steps taken with respect to automated learning of failure recovery policies.

FIG. 2 summarizes some example steps of automated policy learning, such as to learn many of these variable features based on actual observations. For example, given an observation, the entry level for that observation and the number of retries of each action before an escalation occurs may be optimized, via the learning algorithm 114 that uses the logs 110 of the controller execution collected by system administrators. Steps 202 and 204 of FIG. 2 represent executing the existing policy and collecting the log, respectively, used in learning.

More particularly, the learning algorithm takes as input a log L of repair sessions, in which each repair session comprises a sequence $l=o_0, a_1, o_1, \ldots, o_{nl}$, starting with an error notification, followed by a set of repair actions and observations until the problem is fixed. In some cases, sessions end with the machine declared as "dead," but in practice a technician is called for these machines, repairing or replacing them. Therefore, it can be assumed that the sessions end successfully in the healthy state.

To learn the policies from the system logs, various alternatives for computing the recovery policy may be used, as represented in FIG. 2 by step 206 (likely not an actual step, but a determination made beforehand for a domain). One alternative is to begin with a simple, model-free, history-based policy computation, as represented via step 208. Another is a method that learns the POMDP model parameters (step 210), and then uses the POMDP to compute a policy (step 212).

With respect to model-free learning (of Q-values) at step 208, an optimal policy can be expressed as a mapping from action-observation histories to actions. More particularly, histories are directly observable, allowing use of the standard Q function terminology, where Q(h,a) is the expected cost of executing action a with history h and continuing the session until it terminates. This approach is known as model-free, because, for example, the parameters of a POMDP are never learned; note that histories are directly observable, and do not require any assumption about the unobserved state space.

The system log L is used to compute Q:

$$\text{Cost}(l_i) = \sum_{j=i+1}^{|l|} C(a_j) \tag{1}$$

$$Q(h, a) = \frac{\sum_{l \in L} \delta(h + a, l) \text{Cost}(l_{|h|})}{\sum_{l \in L} \delta(h + a, l)} \tag{2}$$

where $l_i$ is a suffix of l starting at action $a_i$, C(a) is the cost of action a, h+a is the history h with the action a appended at its end, and δ(h,l)=1 if h is a prefix of l and 0 otherwise. The Q function is the average cost until repair of executing the action a in history h, under the policy that generated L. Learning a Q function is much faster than learning the POMDP parameters, requiring only a single pass over the training sequences in the system log.

Given the learned Q function, the following policy may be defined:

$$\pi_Q(h) = \min_a Q(h, a) \quad (3)$$

Note that a problem of learning a direct mapping from history to actions is that such policies do not generalize; that is, if a history sequence was not observed in the logs, then the expected cost cannot be evaluated until the error is repaired. One approach that generalizes well is to use a finite history window of size k, discarding the observations and action occurring more than k steps ago. For example, when k=1 the result is a completely reactive Q function, computing Q(o,a) using the last observation only.

With respect to model-based policy learning as represented by step 210, while it is assumed that the behavior of a machine can be captured perfectly using a POMDP as described above, in practice the parameters of the POMDP are not known beforehand. In practice, the parameters that are known are the set of possible repair actions and the set of possible observations, however even the number of possible errors is not initially known, let alone the probability of repair or observation.

Given the log of repair sessions, a learning algorithm learns the parameters of the POMDP. As described above, an adapted Baum-Welch algorithm may be used, comprising an EM algorithm developed for computing the parameters of Hidden Markov Models (HMMs). The Baum-Welch algorithm takes as input the number of states (the number of possible errors) and a set of training sequences. Then, using the forward-backward procedure, the parameters of the POMDP are computed, attempting to maximize the likelihood of the data (the observation sequences). After the POMDP parameters have been learned, the above-described "Perseus" solver algorithm is executed to compute a policy.

For a POMDP for error recovery given the problem features above, a cost-based POMDP may be defined through a tuple <S, A, tr, C, Ω, O> where S is a set of states. A factored representation may be adopted, where $s=<e_0, \ldots, e_n>$ where $e_i \in \{0, 1\}$ indicates whether error i exists. That is, states are sets of failures, or errors of a machine, such as software error or a hardware failure. Another state representing the healthy state may be added, that is, $s_H=<0, \ldots, 0>$. In the tuple, A is a set of actions, such as rebooting a machine or re-imaging it; tr(s,a,s') is a state transition function, specifying the probabilities of moving between states. The transition function is restricted such that tr(s,a,s')>0 if and only if ∀i if $s_i=0$ then $s'_i=0$. That is, an action may only fix an error, not generate new errors. C(s,a) is a cost function, assigning a cost to each state-action pair. Often, costs can be measured as the time (minutes) for executing the action. For example, a reboot may take ten minutes, while re-imaging takes two hours.

Ω represents a set of possible observations. For example, observations are messages from the watchdogs 109, such as a notification of a hard disk failure, or a service reporting an error, and notifications about the success or failure of an action. $O(a,s_0,o)$ is an observation function, assigning a probability to each observation pr(o|a,s').

In a POMDP, the true state is not directly observable and thus a belief state b∈B is maintained, comprising a probability distribution over states, where b(s) is the probability that the system is at state s. Every repair session is assumed to start with an error observation, typically provided by one of the watchdogs 109, whereby $b_0^o$ is defined as the prior distribution over states given an initial observation o. Also maintained is a probability distribution $pr_0(o)$ over initial observations. While this probability distribution is not used in model learning, it is useful for evaluating the quality of policies, e.g., through trials.

It is convenient to define a policy for a POMDP as a mapping from belief states to actions π:B→A. The general goal is to find an optimal policy that brings the machine to the healthy state with the minimal cost. One method for computing a policy is through a value function, V, assigning a value to each belief state b. Such a value function can be expressed as a set of |S| dimensional vectors known as α-vectors, i.e., $V=\{\alpha_1, \ldots, \alpha_n\}$. Then, $\alpha_b = \min_{\alpha \in V} \alpha \cdot b$ is the optimal α-vector for belief state b, and $V(b)=b\cdot\alpha_b$ is the value that the value function V assigns to b, where $\alpha \cdot b = \Sigma_i \alpha_i b_i$ is the standard vector inner product. By associating an action a(α) which each vector, a policy π:B→A can be defined through π(b)=a($\alpha_b$).

The value function may be updated by creating a single α-vector that is optimized for a specific belief state. Such methods, known as point-based value iteration, compute a value function over a finite set of belief states, resulting in a finite size value function. An relatively fast point-based solver that incrementally updates a value function over a randomly chosen set of belief points is described by Matthijs T. J. Spaan and Nikos Vlassis in "Perseus: Randomized point-based value iteration for POMDPs," Journal of Artificial Intelligence Research, 24:195-220 (2005). This solver ensures that at each iteration, the value for each belief state is improved, while maintaining a compact value function representation.

The indefinite horizon POMDP framework (described by Eric A. Hansen in "Indefinite-horizon pomdps with action-based termination," AAAI, pages 1237-1242, (2007)) is adopted as being appropriate for failure recovery. In this framework the POMDP has a single special action $a_T$, available in any state, that terminates the repair session, such as by calling a technician, deterministically repairing the machine, but with a huge cost. Executing $a_T$ in $s_H$ incurs no cost. Using indefinite horizon defines a lower bound on the value function using $a_T$, and executes any point-based algorithm, such as the above-described "Perseus" solver algorithm (step 212).

While training the model parameters, likelihood may be tested on a held out set of sequences that are not used in training, in order to ensure that the resulting model does not over-fit the data. Further, when employing automatic learning methods to create an improved policy, evidence for the quality of the learned models is provided to help system administrators make a decision whether to replace the existing policy with a new policy. Using an imperfect learner such as Baum-Welch does not guarantee that the resulting model indeed maximizes the likelihood of the observations given the policy, even for the same policy that was used to generate the training data. Also, the loss function used for learning the model ignores action costs, thus ignoring this aspect of the problem.

For these reasons, it is possible that the resulting model will describe the domain poorly. Thus, as represented by step 214 some evaluation outside of the domain (or performed on some subset of the domain machines) may be performed before actually implementing the new policy corresponding to the model. The average cost may be used to provide evidence for the validity of the model, including after being implemented. As represented via step 216, if the new policy does not pass the test/evaluation, then the existing policy is kept, (step 218), until some change such as more logged information results in an actually improved policy being created at some later time. If the new policy is tested/evaluated and determined to be improved, then the new policy replaces the existing policy (step 220); note that this policy then becomes the existing policy which itself may become improved at a later time.

There is this described herein a passive policy learning approach that uses available information to improve an existing repair policy. In one implementation, the approach adopts the indefinite-horizon POMDP formalization, and uses the existing controller's logs to learn the unknown model parameters, using an EM algorithm (e.g., an adapted Baum-Welch algorithm). The computed policy for the learned model may then be used in a data center in place of the manually built controller.

Exemplary Operating Environment

Figure 3:
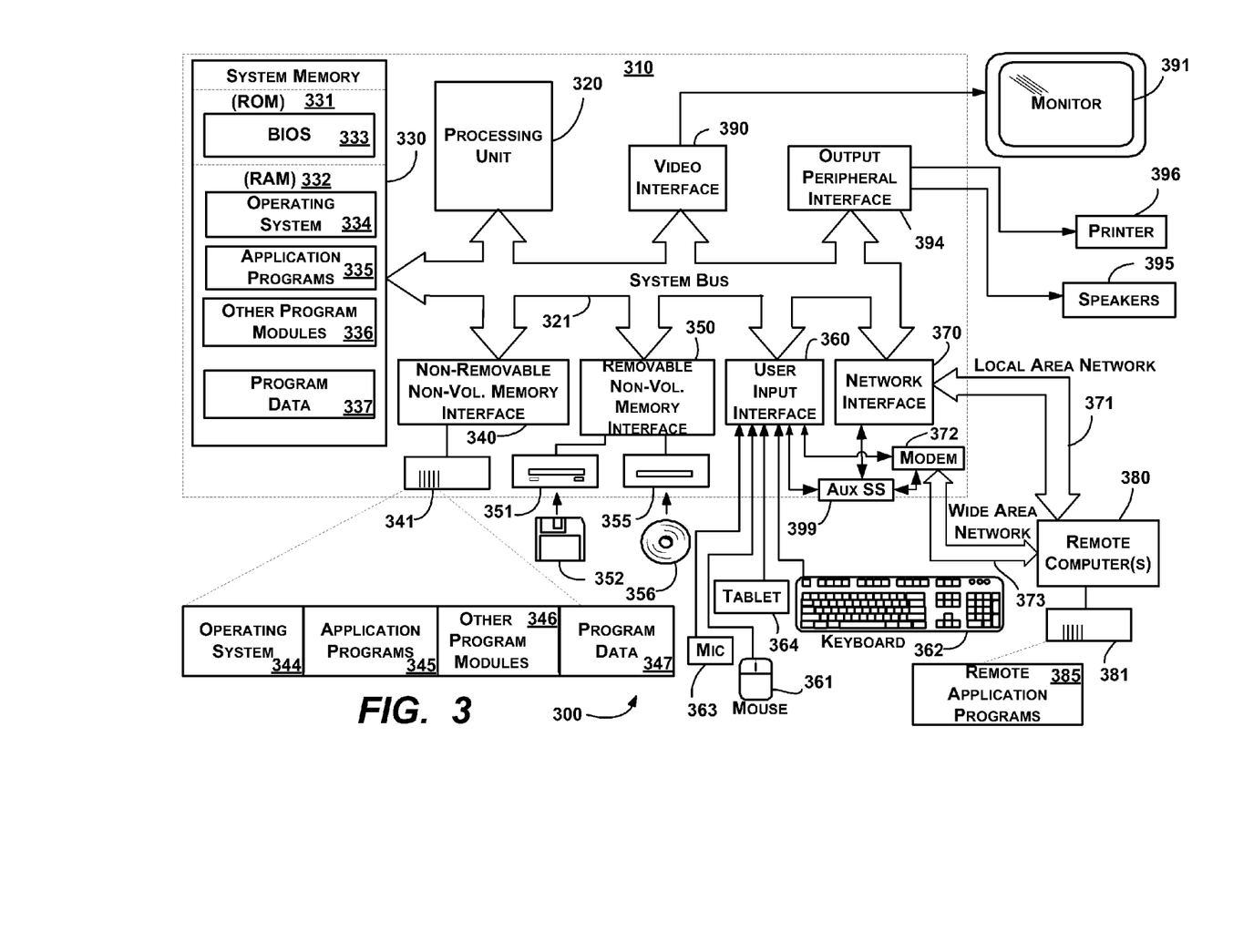
FIG. 3 shows an illustrative example of a computing environment into which various aspects of the present invention may be incorporated.

FIG. 3 illustrates an example of a suitable computing and networking environment 300 on which the examples of FIGS. 1 and 2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
a model learning component configured to access collected observable interactions of an existing repair policy with a process to build a model of the process, the model mapping states of the process to repair actions of the existing repair policy;
a policy computation component configured to compute a new policy based upon the model, the new policy identifying a number of times to retry a first one of the repair actions when the process is in a first one of the states of the process;
a controller configured to apply the new policy to the process and, in an instance when the first state is identified, retry the first repair action the number of times identified by the new policy before escalating the first repair action to a second one of the repair actions; and
one or more processing units configured to execute at least one of the model learning component, the policy computation component, or the controller.

2. The system of claim 1 further comprising a collection component configured to collect the observable interactions into a data structure for access by the model learning component.

3. The system of claim 1 wherein the new policy performs automatic fault recovery.

4. The system of claim 1, wherein the model comprises a partially observable Markov decision process.

5. The system of claim 4, wherein the model learning component uses an expectation maximization algorithm to learn the partially observable Markov decision process.

6. The system of claim 4, wherein the policy computation component computes the new policy using a point-based value iteration algorithm.

7. The system of claim 6, wherein the point-based value iteration algorithm is executed by a cost-based indefinite-horizon formalization.

8. The system of claim 1, wherein the process corresponds to a computing machine in a datacenter.

9. A method comprising:
accessing collected observable interactions of an existing repair policy with a process to build a model of the process, the model mapping states of the process to repair actions of the existing repair policy;
computing a new policy based upon the model, the new policy identifying a number of times to retry a first one of the repair actions when the process is in a first one of the states of the process; and
applying the new policy to the process and, in an instance when the first state is identified, retrying the first repair action the number of times identified by the new policy before escalating the first repair action to a second one of the repair actions.

10. The method according to claim 9, the first state reflecting an error message generated by the process.

11. The method according to claim 9, the observable interactions being accessed from a recovery log associated with the process.

12. The method according to claim 9, the model being computed based on a first action cost associated with the first repair action and a second action cost associated with the second repair action.

13. The method according to claim 12, the second action cost being higher than the first action cost.

14. One or more computer-readable storage devices comprising instructions which, when executed by one or more processing units, cause the one or more processing units to perform:

accessing collected observable interactions of an existing repair policy with a process to build a model of the process, the model mapping states of the process to repair actions of the existing repair policy;

computing a new policy based upon the model, the new policy identifying a number of times to retry a first one of the repair actions when the process is in a first one of the states of the process; and     applying the new policy to the process and, in an instance when the first state is identified, retrying the first repair action the number of times identified by the new policy before escalating the first repair action to a second one of the repair actions.

15. The one or more computer-readable storage devices according to claim 14, the first state reflecting an error message generated by the process.

16. The one or more computer-readable storage devices according to claim 14, the observable interactions being accessed from a recovery log associated with the process.

17. The one or more computer-readable storage devices according to claim 14, the model being computed based on a first action cost associated with the first repair action and a second action cost associated with the second repair action.

18. The one or more computer-readable storage devices according to claim 17, the second action cost being higher than the first action cost.

\* \* \* \* \*